United States Patent
Schmidt et al.

[11] Patent Number: 5,910,522
[45] Date of Patent: Jun. 8, 1999

[54] COMPOSITE ADHESIVE FOR OPTICAL AND OPTO-ELECTRONIC APPLICATIONS

[75] Inventors: Helmut Schmidt, Saarbrücken-Güdingen; Martin Mennig, Quierschied; Gerhard Jonschker, Spiesen-Elversberg; Volker Gerhard, Saarbrüken, all of Germany

[73] Assignee: Institut für Neue Materialien gemeinnützige GmbH, Saarbrü cken, Germany

[21] Appl. No.: 08/930,424

[22] PCT Filed: Apr. 2, 1996

[86] PCT No.: PCT/EP96/01448

§ 371 Date: Oct. 3, 1997

§ 102(e) Date: Oct. 3, 1997

[87] PCT Pub. No.: WO96/31572

PCT Pub. Date: Oct. 10, 1996

[30] Foreign Application Priority Data

Apr. 3, 1995 [DE] Germany .................... 195 12 427

[51] Int. Cl.⁶ .................................................. C08K 3/00
[52] U.S. Cl. ........................... 523/168; 524/492; 524/493
[58] Field of Search ................................. 524/492, 493; 523/168

[56] References Cited

U.S. PATENT DOCUMENTS 5,307,438  4/1994  Bilkadi et al. .................... 385/141

FOREIGN PATENT DOCUMENTS 0219242  4/1987  European Pat. Off. .
0609841  8/1994  European Pat. Off. .

*Primary Examiner*—Edward J. Cain
*Attorney, Agent, or Firm*—Oblon, Spivak, McClelland, Maier & Neustadt, P.C.

[57] ABSTRACT

The composite adhesive for optical and opto-electronic applications contains the following:

a) transparent polymers and/or polymerizable oligomers and/or monomers suitable for use as adhesive,
b) nanoscale inorganic particles,
c) optionally, compounds for the surface modification of said inorganic particles, and
d) optionally, a crosslinking initiator.

The composite adhesive is suitable for connecting individual components of optical or opto-electronic elements and for constructing such elements.

14 Claims, 3 Drawing Sheets

COMPOSITE ADHESIVE FOR OPTICAL AND OPTO-ELECTRONIC APPLICATIONS

BACKGROUND OF THE INVENTION

1. Field of the Invention

The invention relates to a composite adhesive for optical and opto-electronic applications, for example for connecting individual components such as optical fibres or for constructing (integrated) optical chips (IO-chips) for the production of optical fibre-chip couplings etc.

2. Description of the Background

Various UV or thermally curing transparent organic adhesives are presently employed in opto-electronics for connecting components of different materials, e.g., $SiO_2$ optical fibres and IO-chips made of glass, silicon, lithium niobate or semi-conductors, and for constructing optical components from these materials.

In doing so, utmost precision in adjusting the parts to be connected is required (±0,1 μm) so that e.g., in fibre-chip-couplings the lightwave guides in the fibre and in the chip come into exact contact and light transmission losses are minimized thereby. An additional requirement is that the glued joint must remain stable in the temperature range of from −45° C. to +85° C. (or +135° C., respectively) and does not undergo maladjustment within said range.

Conventional adhesives do not meet said requirements satisfactorily. They often tear at temperatures below −40° C. and due to the relatively high coefficient of thermal expansion of the organic adhesive the glued joint is subject to an excessively high maladjustment or may be destroyed at elevated temperatures.

It is known from the prior art that, e.g., the curing behaviour (shrinkage) of transparent adhesive may be improved by mixing finely ground (particle size in the μm range), already cured adhesive into the uncured adhesive. This, however, inevitably leads to an increase in the viscosity of the adhesive so that the amount of solids that can be added is limited to a few %, depending on the application.

Furthermore, no qualitative change in the properties of the cured composite adhesive (e.g. an increase of the thermal stability or a decrease of the coefficient of thermal expansion) can be achieved in this manner. When using inorganic powder having particle sizes in the μm or sub-μm range the transparency decreases due to light scattering. With certain limitations this also applies to agglomerated powders of nanoscale primary particles (e.g. aerosils).

SUMMARY OF THE INVENTION

Object of the present invention is to provide composite adhesives for optical and opto-electronic applications which are operable in the temperature range of at least from −45° C. to +85° C. (and even better to 135° C.), result in low optical scattering and attenuation and afford sufficient adhesive strength for application. Furthermore said adhesives should have a viscosity which is advantageous for handling purposes.

A further object is the provision of optical and opto-electronic elements made by means of said composite adhesives.

Object of the present invention are composite adhesives for optical and opto-electronic applications which are characterized in that they contain a) at least one transparent polymer and/or polymerizable oligomer and/or polymerizable monomer suitable for use as adhesive;

b) nanoscale inorganic particles;

c) optionally, compounds for the surface modification of said inorganic particles; and d) optionally, a crosslinking initiator.

DETAILED DESCRIPTION OF THE INVENTION

Tt has surprisingly been found that if nanoscale particles are incorporated in organic or organic-inorganic, respectively, polymer adhesives in agglomerate-free condition not only the optical transparency can be maintained, but also a so far not observed steep qualitative increase in the mechanical and thermo-mechanical properties can be generated, which increase leads to a strong improvement in the use properties of the adhesive.

The important factor for said improvement is that said nanoscale particles are integrated into the adhesive not as agglomerated powders but in the form of stabilized, (substantially) agglomerate-free suspensions and that said agglomerate-free condition is maintained (optionally by an appropriate surface modification of said particles) even after the excess solvent has been stripped off the adhesive. This is effected, e.g., by matching the polarities of matrix and particles. This also leads to a relatively strong interaction between matrix and particles, which interaction upon curing of the adhesive results in interface structures in the composite which presumably are responsible for the observed qualitative change in properties. Said incorporation in nanodisperse form presumably has a double effect:

On the one hand it results in interactions between particles and matrix, which interactions change the matrix material at the inner interfaces with the particles and thus lead to inner interface structures having new properties. On the other hand, said incorporation in nanoscale form causes the proportion by volume of said inner interfaces with respect to the total composite material to become very high, due to the high surface area of the nanoparticles, so that the changes in properties attributable to said interfaces can also be clearly observed on a macroscopic level.

Said type of nanocompositing is achieved either by starting from naturally agglomerated powders (e.g. aerosils) and lastingly breaking up the soft agglomerates by dispersing them in a suitable medium (foreign to the adhesive) (e.g., by using methacrylic acid (ester), see Example 1) or by employing stabilized nanoscale suspensions (e.g. silica sols) from the beginning. However, also in this case it is of crucial importance that the agglomerate-free condition is maintained in the composite (e.g. by appropriate surface modifications) in order to realize the above causal chain for generating said new properties.

In the following this will be explained by reference to the appended FIGS. 1 to 4.

Figure 1:
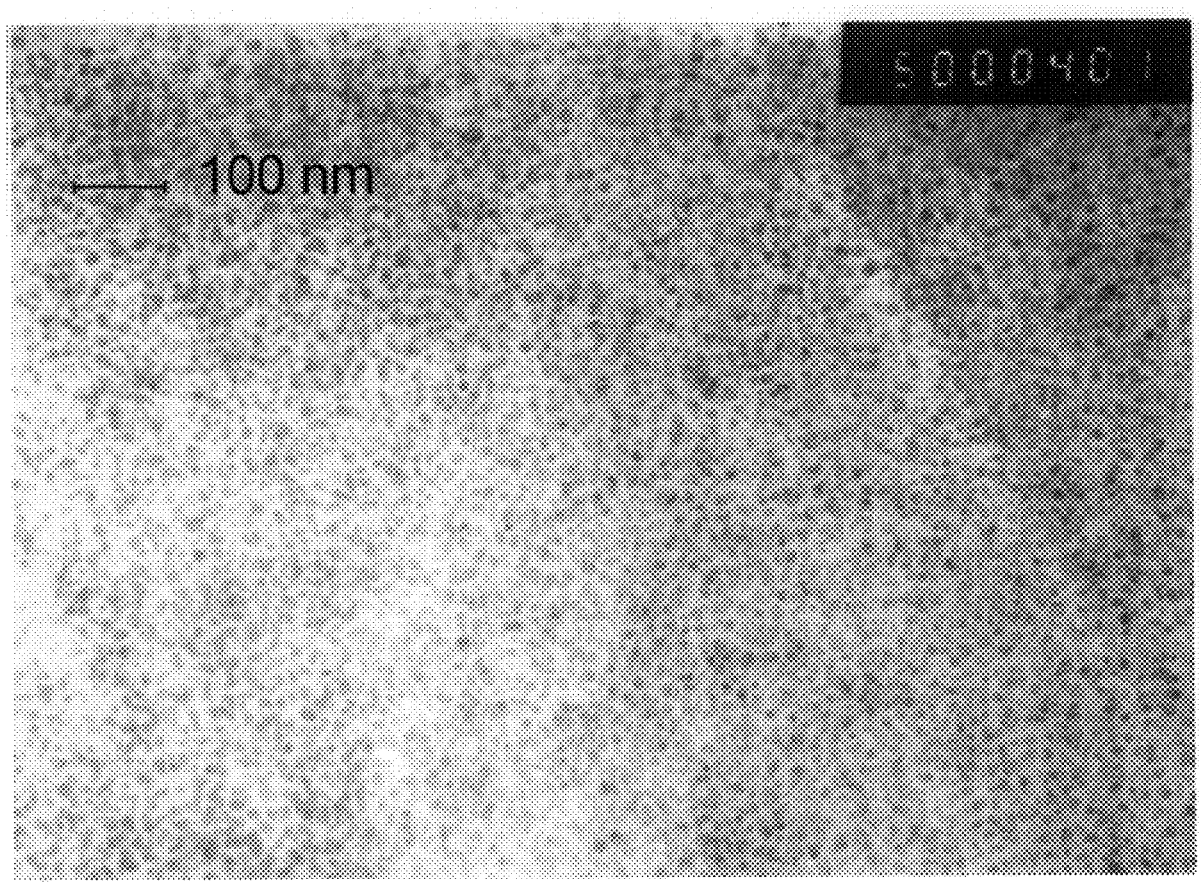
Figure 2:
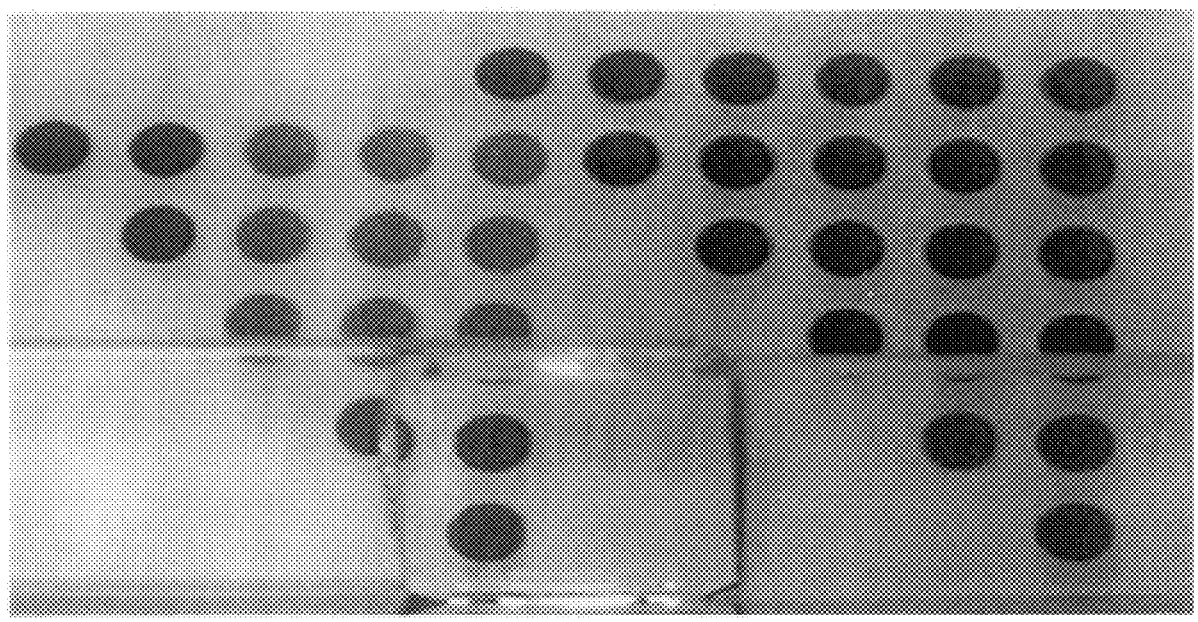
Figure 3:
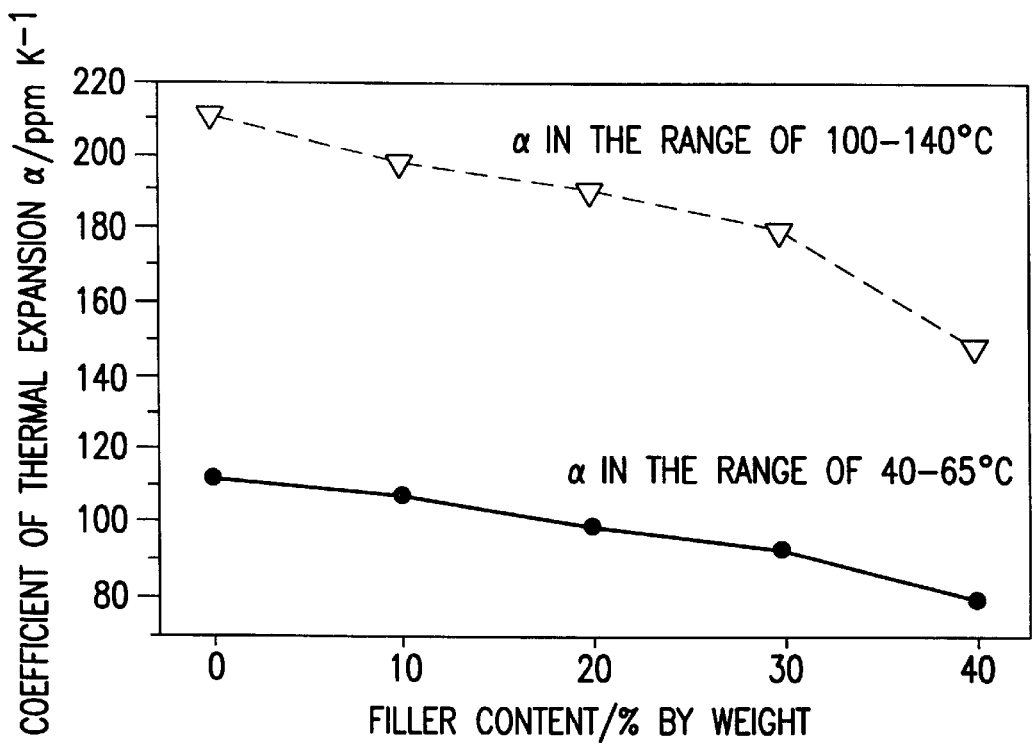
Figure 4:
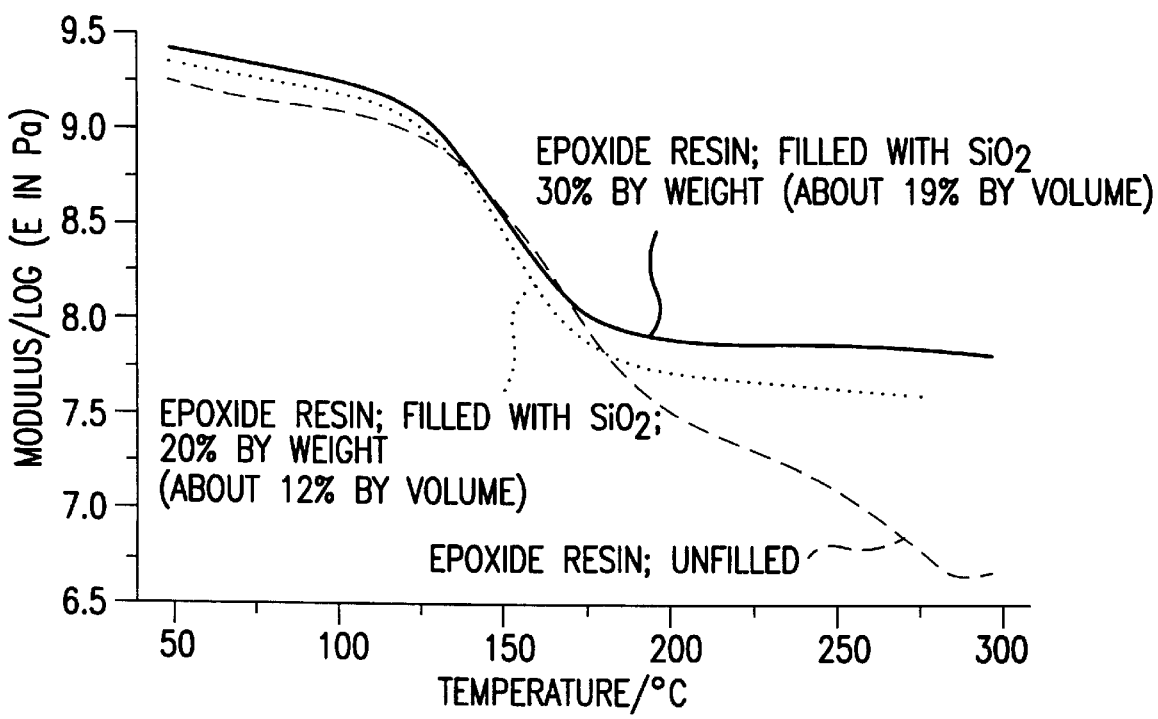

FIG. 1 shows an electron microscope photograph of a composite adhesive having nanoscale $SiO_2$ particles in a matrix of epoxide resin. By the manner of producing the composite and the starting materials employed for said purpose (see Example 3) the maintenance of a completely agglomerate-free incorporation of the $SiO_2$ particles also in the cured adhesive can be achieved (FIG. 1). FIG. 2 using the glueing of glass by means of said adhesive as an example shows that in said case the transparency of the adhesive is completely retained, which makes it particularly suitable for use in optical applications. If in a different application transparency is not desired it can be reduced by additional incorporation of larger particles and/or by light-absorbing additives without losing the gain in thermo-mechanical properties illustrated in FIGS. 3 and 4. From FIG. 3 it can be taken that in the temperature range of from 40–65° C. the coefficient of thermal expansion decreases noticably with increasing filler content, starting at about 120 ppm/K and amounting to only about 80 ppm/K at a filler content of 40% by weight (corresponding to about 20% by volume). This constitutes a decrease of as much as 33% in comparison to the unfilled adhesive. Even more drastic are the changes in properties with respect to the thermal stability, as can be seen from FIG. 4. While the elastic modulus of the unfilled adhesive steadily decreases for temperatures above the transformation temperature (about 150° C.), indicating a destruction of the material, already at a filler content of only 12% by volume it can clearly be recognized that on the one hand the decrease in the elastic modulus above Tg is substantially smaller than in the unfilled condition and on the other hand the adhesive maintains its mechanical properties up to temperatures of 300° C.

It is to be noted that the high filler contents were associated with an increase of the viscosity of the uncured adhesive by only 2–3 orders of magnitude which does not significantly hamper its application. This is also only possible if the interactions of the particles with the matrix of the adhesive are adjusted such (e.g. by surface modification of said particles) that particle agglomeration is prevented also in the adhesive. Otherwise a pasty, highly viscous material which cannot be used as adhesive will be obtained.

The composite adhesives for optical and opto-electronic applications according to the present invention are characterized particularly in that due to an inner interface phase they show new mechanical and thermo-mechanical properties, in particular a reduced coefficient of thermal expansion and an increased temperature stability their optical properties are adjustable within broad ranges by the nanoparticles; in particular it is possible to realize completely transparent adhesives despite a high filler content.

As polymers employable according to the present invention any known transparent plastics which are suitable as adhesives may be used, for example polyacrylic acid, polymethacrylic acid, polyacrylates, polyacryloamides, polycarbamides, polymethacrylates, polyolefins, polystyrene, polyamides, polyimides, polyvinyl compounds such as polyvinyl chloride, polyvinyl alcohol, polyvinyl butyral, corresponding copolymers, such as, e.g., poly(ethylene-vinylacetate), polyesters, e.g., polyethylene terephthalate or polydiallylphthalate, polyarylates, polycarbonates, polyethers, e.g. polyoxymethylene, polyethylene oxide or polyphenylene oxide, polyether ketones, polysulfones, polyepoxides, fluoropolymers, polysiloxanes, organo polysiloxanes or hetero polysiloxanes formed with metals and transition metals, as described, e.g., in EP-A-36648 and EP-A-223067, as well as blends of two or more of said polymers as far as they are compatible with each other. Instead of the mentioned polymers oligomers and/or precursors (monomers) thereof may be employed as well.

Among said polymers particularly preferred are transparent polymers soluble in organic solvents such as, e.g., polyacrylates, polymethacrylates (e.g. PMMA), epoxide resins and polyvinyl butyral.

Examples of the nanoscale inorganic particles are, e.g., oxides such as CaO, ZnO, CdO, $SiO_2$, $TiO_2$, $ZrO_2$, $CeO_2$, $SnO_2$, PbO, $Al_2O_3$, $In_2O_3$ and $La_2O_3$; sulfides such as CdS and ZnS; selenides such as GaSe, CdSe or ZnSe; tellurides such as ZnTe or CdTe; halides such as NaCl, KCl, $BaCl_2$, AgCl, AgBr, AgI, CuCl, CuBr, $CdI_2$ or $PbI_2$; carbides such as $CeC_2$; arsenides such as AlAs, GaAs or CeAs; antimonides such as InSb; nitrides such as BN, AlN, $Si_3N_4$ or $Ti_3N_4$; phosphides such as GaP, InP, $Zn_3P_2$ or $Cd_3P_2$; carbonates such as $Na_2CO_3$, $K_2CO_3$, $CaCO_3$, $SrCO_3$ and $BaCO_3$; carboxylates, e.g., acetates such as $CH_3COONa$ and $Pb(CH_3COO)_4$; phosphates; sulfates; silicates; titanates; zirconates; aluminates; stannates; plumbates and corresponding mixed oxides, the composition whereof preferably corresponds to a composition of common glass with a low coefficient of thermal expansion, e.g., binary, tertiary or quaternary combinations of $SiO_2$, $TiO_2$, $ZrO_2$ and $Al_2O_3$. Also suitable are, e.g., mixed oxides having a Perowskite structure such as $BaTiO_3$ or $PbTiO_3$. Furthermore, organically modified inorganic particles such as, e.g., particulate polymethyl siloxanes, methacryl-functionalized oxide particles and salts of methylphosphoric acid may be employed.

The preparation of said nanoscale particles may be effected in usual manner, e.g., by flame hydrolysis, flame pyrolysis and plasma processes [see A. N. Dubrovina et al., Kristallografiya, 26 (1981) 637–639], colloid techniques [see E. Matijevic, "Preparation and Interaction of Colloids of Interest in Ceramics" in "Ultrastructure Processing of Advanced Ceramics", Ed.: J. D. Mackenzie, D. R. Ulrich, John Wiley & Sons, New York (1988) 429, and other publications of E. Matijevic et al.], sol-gel processes [see R. Naβ, H. Schmidt, Journal of Non-Crystalline Solids 121 (1990) 329–333; M. A. Anderson et al., Journal of Membrane Science, 39 (1988) 243–258], controlled nucleation and growth processes [see e.g. L. Spanhel and M. A. Anderson, J. Amer. Chem. Soc. 113 (1991), 2826–2833; ller, The Chemistry of Silica, Wiley & Sons, New York 1979], MOCVD processes [see G. B. Springfellow, "Organometallic Vapor Phase Epitaxy; Theory and Practice", Academic Press, New York (1989)], emulsion processes [see DE 4118185 A1] and the processes described in DE 4130550 A1 and DE 4133621 A1.

The nanoscale particles usually have a particle size of from 1 to 200 nm, preferably 2 to 50 nm and particularly 5 to 20 nm. They preferably consist of inorganic materials having a low coefficient of thermal expansion, materials having a coefficient of expansion of $<10^{-4}$ $K^{-1}$ being particularly preferred. A very low coefficient of thermal expansion of $5 \times 10^{-7}$ $K^{-1}$ is exhibited, e.g., by $SiO_2$ particles which show the additional advantage of a thixotropic effect when being dispersed in a polymer matrix. Said thixotropic effect is presumably due to the formation of a percolating skeleton wherein the particles are in contact with each other. The viscosity-modifying properties of said nanoscale particles may be adjusted by suitable surface modification. Particularly preferred are stabilized colloidal, nanodisperse sols of inorganic particles such as, e.g., silica sols of the company BAYER, $SnO_2$ sols of the company Goldschmidt, $TiO_2$ sols of the company Merck, $SiO_2$, $ZrO_2$, $Al_2O_3$, $Sb_2O_3$ sols of the company Nissan Chemicals or aerosil dispersions of the company Degussa.

The proportion by volume of the nanoscale particles in the composite adhesive usually is from 1 to 50% by volume, preferably 1 to 30% by volume and particularly 5 to 20% by volume.

The nanoscale particles preferably consist of a material whose refractive index in the UV-VIS-NIR wavelength range (10 to 10,000 nm) is approximately the same as the refractive index of the polymer matrix. The polymer matrix usually has a refractive index of from 1.2 to 2.0, preferably from 1.3 to 1.7. If a certain particle material does not have the desired refractive index, refractive index modifying additives may be employed. For example, $SiO_2$ particles could be modified with $TiO_2$ or $ZrO_2$.

The mutual adjustment of the refractive indices of polymer matrix and nanoscale particles may, however, be also effected by mixing two or more compatible polymers, oligomers and monomers (a) or non-reactive additive materials of different refractive index in a quantitative ratio at which the refractive index of the polymer blend is approximately equal to the refractive index of the nanoscale particles.

For example, when using polymethyl methacrylate (PMMA) as transparent component a), styrene may be added thereto which styrene, upon its polymerization to polystyrene, results in an increase of the refractive index.

For the surface modification of said nanoscale particles it is possible to use, e.g., substances which can serve several functions (in part at the same time). For example, they can 1. prevent the agglomeration of the particles during the preparation of the adhesive
2. match the Theological behaviour of the adhesive even at high filler contents ($\geq 18\%$ by volume) with the requirements by adjusting the interactive forces between the particles and the adhesive matrix and/or other neighbouring particles
3. maintain the transparency of the filler, above all in the VIS-NIR range, despite high filler contents ($\geq 18\%$ by volume)
4. adjust the mechanical, thermo-mechanical and/or adhesive and cohesive, respectively, properties of the adhesives in the cured state within a broad range by reactions with the adhesive matrix and/or other particles.

Suitable as surface modifier, i.e., as surface modifying, low molecular weight organic (=carbon containing) compound which has at least one functional group capable of reacting and/or (at least) interacting with groups present on the surfaces of the powder particles and the adhesive matrix, are particularly compounds having a molecular weight which does not exceed 500, preferably not exceed 350 and particularly not exceed 200. Such compounds are preferably liquid under normal conditions and preferably have not more than a total of 15, particularly not more than a total of 10 and particularly preferred not more than 8 carbon atoms. The functional groups which said compounds must carry predominantly depend on the surface groups of the nanoscale material employed in a certain instance and, additionally, also on the desired interaction with the adhesive matrix. Thus, an acid/base-reaction according to Bronsted or Lewis (including complex formation and adduct formation) may, for example, take place between the functional groups of the surface modifying compound and the surface groups of the particles. An example for a further suitable interaction is the dipole-dipole interaction. Examples of suitable functional groups are carboxylic acid groups, (primary, secondary, tertiary and quaternary) amino groups and C—H-acidic groupings. Several of said groups may also be present in a molecule at the same time (betains, amino acids, EDTA, etc.).

Examples of preferred surface modifiers correspondingly are saturated or unsaturated mono- and polycarboxylic acids (preferably monocarboxylic acids) having 1 to 12 carbon atoms (e.g. formic acid, acetic acid, propionic acid, butyric acid, pentanoic acid, hexanoic aicd, acrylic acid, methacrylic acid, crotonic acid, citric acid, adipic acid, succinic acid, glutaric acid, oxalic acid, maleic acid and fumaric acid) as well as their esters (preferably $C_1$–$C_4$ alkyl esters) and amides, e.g. methyl methacrylate.

Examples of further suitable surface modifiers are quaternary ammonium salts of the formula $NR^1R^2R^3R^{4+}X^-$ wherein $R^1$ to $R^4$ are aliphatic, aromatic or cycloaliphatic groups having preferably 1 to 12, particularly 1 to 6 carbon atoms and being optionally different from each other and $X^-$ is an inorganic or organic anion; mono- and polyamines, particularly those of the general formula $R_{3-n}NH_n$, wherein n=0, 1 or 2 and the radicals R independently are alkyl groups having 1 to 12, particularly 1 to 6 and particularly preferred 1 to 4 carbon atoms (e.g. methyl, ethyl, n- and i-propyl and butyl) and ethylene polyamines (e.g. ethylene diamine, diethylene triamine, etc.); amino acids; imines, β-dicarbonyl compounds having 4 to 12, particularly 5 to 8 carbon atoms such as acetylacetone, 2,4-hexanedione, 3,5-heptanedione, aceto-acetic acid and acetoacetic acid $C_1$–$C_4$-alkylesters; silanes, particularly organoalkoxy-silanes such as those employed for the surface modification of colloidal silica (e.g. those of the general formula $R_{4-m}Si(OR')_m$ wherein the groups R and R' independently are $C_1$–$C_4$-alkyl and m is 1, 2, 3 or 4); and modified alkoxides wherein a part of the groups OR (R being defined as above) is replaced by inert organic groups.

For the electrostatic stabilization of the nanoscale particles compounds known for said purpose, such as, e.g. NaOH, $NH_3$, KOH, $Al(OH)_3$ may, for example, also be employed, provided they are compatible with the adhesive matrix.

The polymers, oligomers or monomers a) and the nanoscale particles b) and, optionally the surface-modifying substances c) may be employed either as such, or, preferably, as solution in an organic solvent or in water. Examples of suitable solvents are alcohols such as butanol, ketones such as acetone, esters such as ethyl acetate, ethers such as tetrahydrofuran, and aliphatic, aromatic and halogenated hydrocarbons such as hexane, benzene, toluene and chloroform.

The preparation of the composite adhesive according to the present invention may be carried out in various ways.

For example, the nanoscale particles may be dispersed, e.g., with stirring or by means of ultrasound, in one of the solvents mentioned above and/or one of the polymerizable or curable compounds mentioned above. The resulting dispersion is then mixed with said transparent polymer, oligomer and/or monomer either as such or diluted with a solvent. The solvent used for dilution is either identical with the solvent used for the dispersion or miscible therewith. Of course, the nanoscale particles may also be dispersed in a solution of the transparent polymer, oligomer and/or monomer. Alternatively, the polymer and the polymerizable compounds, respectively, a) may be dissolved in or mixed into a stabilized dispersion (aqueous or non-aqueous) of the nanoscale particles, optionally with the addition of the surface-modifying substances c).

If polymerizable or curable compounds are used, the composite adhesive also contains a polymerization, polyaddition and/or polycondensation catalyst which is capable of thermally and/or photochemically inducing the crosslinking and curing (collectively referred to as "crosslinking initiator").

As photoinitiators, e.g., the commercially available starters may, be employed. Examples thereof are Irgacure®184 (1-hydroxycyclohexylphenyl ketone), Irgacure® 500 (1-hydroxycyclohexylphenyl ketone, benzophenone) and other photoinitiators of the Irgacure®-type available from the company Ciba-Geigy; Darocur®1173, 1116, 1398, 1174 and 1020 (obtainable from the company Merck), benzophenone, 2-chlorothioxanthone, 2-methylthioxanthone, 2-isopropylthioxanthone, benzoin, 4,4'-dimethoxybenzoin, benzoin ethylether, benzoin isopropylether, benzildimethyl ketal, 1,1,1-trichloroacetophenone, diethoxyacetophenone and dibenzosuberone.

As thermal initiators, i.a., organic peroxides in the form of diacyl peroxides, peroxy dicarbonates, alkylperesters, dialkylperoxides, perketals, ketone peroxides and alkylhydroperoxides may be envisaged. Specific examples of such thermal initiators are dibenzoyl peroxide, tert.-butylperbenzoate and azobisisobutyronitrile.

The crosslinking initiator, if employed, usually is used in an amount of from 0.1 to 5%, preferably 0.5 to 3% by weight based on the adhesive composition.

In order to increase the viscosity or for the preparation of solvent-free adhesives, the solvents may be removed partially or completely.

The finished composite adhesive is applied onto the substrate(s) to be connected or said substrate(s) is (are) dipped into said adhesive. If the adhesive does not contain any crosslinkable (polymerizable) groups, its curing can be effected by usual drying at temperatures of preferably below 150° C.

If the composite adhesive contains a crosslinkable compound, following the application of the adhesive onto the substrate(s) to be connected, said compound is crosslinked and cured thermally and/or by irradiation (e.g. by means of an UV lamp or a laser), depending on the type of crosslinking initiator employed.

The curing conditions (temperature, UV wavelength etc.) depend on the decomposition conditions of the crosslinking initiator. Thermal curing is usually effected at temperatures below 150° C.

The composite adhesive according to the present invention is suitable for connecting individual components of optical or opto-electronic elements, e.g., $SiO_2$ optical fibres, and optical components, e.g., of glass, silicon, lithium niobate, organic polymers or inorganic-organic composite materials or semiconductors as well as for the construction of optical or opto-electronic components made of these materials.

Due to their particular compositions the composite adhesives according to the present invention in comparison to conventional adhesives in this field of application make possible a reduction of the coefficient of thermal expansion, a lower temperature dependence of the elastic modulus, an increase in the thermal stability as well as a more rapid and uniform curing. It is assumed that said changes in properties are at least in part attributable to the effect of inner interfaces in the composite since the adhesive matrix is structurally altered at said inner interfaces by the interaction with the nanoscale (surface-modified) particles.

The following examples illustrate the present invention without limiting the scope thereof in any way.

EXAMPLES

EXAMPLE 1

In 20 ml of methyl methacrylate 4.5 g of $SiO_2$ particles (Aerosil®R 972 of the company Degussa) are dispersed by means of sonication, whereafter 0.8 ml of styrene are added and mixing by sonication is again carrried out. Thereafter about 20 ml of a commercially available acrylate adhesive (Delo-Photobond®412 or 420 of the company Delo) are added.

The resulting composite adhesive ($SiO_2$ content: about 10% by weight) shows thixotropic flow behaviour. It may be irradiated and cured within 10 minutes by means of a Xenon lamp from a distance of 20 cm.

EXAMPLE 2

The preparation of the adhesive and the curing are carried out as in Example 1. However, instead of the acrylate adhesive a UV-curable epoxide adhesive (Vitralit® of the company Panacol-Elosol) is employed. The mixture of the epoxide resin and the $SiO_2$ dispersion in methyl methacrylate shows a viscosity which is lower by a factor of 10 than that of the individual components. Therefore, said adhesive is particularly suitable for applications with a small glueing joint.

EXAMPLE 3

To 10 g of Nissan IPA-ST (silica sol of Nissan Chemical Industries, Ltd.; 30% by weight of $SiO_2$ in isopropanol) 3 g of TMAH-solution (1% by weight of tetramethyl ammonium hydroxide pentahydrate in isopropanol) are added dropwise with stirring. Thereafter, 10 g of adhesive (Panacol®X-942-739-00, UV-curing epoxide resin) are added with stirring. In the next step the solvent is stripped off on a rotary evaporator at 50° C. and about 12 mbar.

As adhesive a cycloaliphatic diepoxide (e.g. 3,4-epoxycyclohexylmethyl-3,4-epoxycyclohexylcarboxylate such as the product K 126 of the company Degussa or the product UVR-6110 of the company Union Carbide) may, for example, be used.

In this case the procedure is as described above, but 2–4% by weight (based on the resin employed) of photoinitiator must be added. As initiators cationic photoinitiators such as, e.g., Degussa KI 85 are suitable.

The curing is effected by means of UV exposure for 2 minutes at a lamp output of 200 W.

Obtained is a composite adhesive whose properties are illustrated and shown, respectively, in FIGS. 1 to 4.

EXAMPLE 4

236.1 g of 3-glycidyloxypropyltrimethoxysilane (GPTS) are refluxed for 24 hours with 27.0 g of water. Subsequently, the methanol formed is evaporated at 70° C. on a rotary evaporator.

With stirring 100.0 g of TMAH-modified Nissan IPA-ST silica sol (corresponding to 30.0 g of $SiO_2$, see Example 3) are added to 68.3 g of the GPTS condensate thus prepared. 2.1 g of triarylsulfonium hexafluoroantimonate (KI 85 of the company Degussa) are added as photoinitiator. In order to obtain solvent-free adhesives, the solvent (isopropanol) is removed on a rotary evaporator at 50° C. and 12 mbar.

EXAMPLE 5

With stirring 69.0 g of TMAH-modified Nissan IPA-ST silica sol (corresponding to 20.7 g of $SiO_2$, see Example 3) are added to 47.6 g of the GPTS condensate of Example 4 and the solvent (isopropanol) is removed on a rotary evaporator at 50° C. and 12 mbar. Thereafter 29.5 g of a cycloaliphatic diepoxide (K 126 of the company Degussa) and 2.1 g of photoinitiator (KI 85 of the company Degussa) are added with stirring.

We claim:

1. A composite adhesive for optical and opto-electronic applications, comprising:
    (a) at least one transparent polymer and/or polymerizable oligomer and/or polymerizable monomer suitable for use as an adhesive,
    (b) nanoscale inorganic particles,
    (c) compounds for the surface modification of said nanoscale inorganic particles, and
    (d) optionally, a crosslinking initiator,
    wherein said nanoscale inorganic particles are substantially agglomerate-free, and wherein said compounds for the surface modification of said nanoscale inorganic particles are selected from a group consisting of carboxylic acid amides, carboxylic acid esters, amino acids, β-diketones, imides and quaternary ammonium salts of the general formula $N^+R^1R^2R^3R^4X^-$, wherein the radicals $R^1$ to $R^4$, the same or different from each other, may be aliphatic, aromatic and/or cycloaliphatic groups and $X^-$ is an inorganic or organic anion.

2. The composite adhesive according to claim 1, comprising 1 to 50% by volume of said nanoscale inorganic particles.

3. The composite adhesive according to claim 1, comprising 1 to 30% by volume of said nanoscale inorganic particles.

4. The composite adhesive according to claim 1, wherein the transparent polymers, oligomers and/or monomers (a) are selected from the group consisting of poly(meth)acrylic acid, poly(meth)acrylates, poly(meth)-acrylic acid amides, polycarbamides, polyolefins, polystyrene, polyamides, polyimides, polyvinyl compounds, polyesters, polyarylates, polycarbonates, polyethers, polyether ketones, polysulfones, polyepoxides, fluoropolymers, organopolysiloxanes and heteropolysiloxanes and the corresponding monomers and/or oligomers.

5. The composite adhesive according to claim 1, wherein said nanoscale inorganic particles are selected from the group consisting of oxides, sulfides, selenides, tellurides, halides, carbides, arsenides, antimonides, nitrides, phosphides, carbonates, carboxylates, phosphates, sulfates, silicates, titanates, zirconates, aluminates, stannates, plumbates and mixed oxides.

6. The composite adhesive according to claim 1, wherein said nanoscale inorganic particles have a particles size of from 1 to 200 nm.

7. The composite adhesive according to claim 1, wherein said compounds for the surface modification of said nanoscale inorganic particles are NaOH, $NH_4OH$, KOH and/or $Al/(OH)_3$, provides that said compounds are compatible with the adhesive matrix.

8. The composite adhesive according to claim 1, wherein the crosslinking initiator comprises photo-initiators and/or organic peroxides and/or azo compounds.

9. The composite adhesive according to claim 1, wherein said nanoscale inorganic particles and the polymer matrix formed from components (a) and optionally (c) are of approximately the same refractive index upon curing.

10. The composite adhesive according to claim 9, wherein the refractive indices of said nanoscale inorganic particles and the polymer matrix range from 1.2 to 2.0.

11. The composite adhesive according to claim 9, wherein the refractive indices of said nanoscale inorganic particles and the polymer matrix range from 1.3 to 1.7.

12. An optical or opto-electronic element, comprising components connected by means of the composite adhesive according to claim 1.

13. A process for producing an optical or opto-electronic element, comprising applying a composite adhesive of claim 1 to a joint connecting a first component and a second component, followed by thermally or photochemically curing the composite adhesive.

14. A process for connecting components, comprising applying the composite adhesive of claim 1 to a joint connecting a first component and a second component, followed by thermally or photochemically curing the composite adhesive.

* * * * *